United States Patent
Gentle et al.

(10) Patent No.: US 8,213,316 B1
(45) Date of Patent: Jul. 3, 2012

(54) METHOD AND APPARATUS FOR IMPROVING VOICE RECORDING USING AN EXTENDED BUFFER

(75) Inventors: Christopher Reon Gentle, Gladesville (AU); Julian James Orbach, Macquarie Park (AU); Alastair Rankine, Beaconsfield (AU)

(73) Assignee: Avaya Inc., Basking Ridge, NJ (US)

( * ) Notice: Subject to any disclaimer, the term of this patent is extended or adjusted under 35 U.S.C. 154(b) by 679 days.

(21) Appl. No.: 11/521,207

(22) Filed: Sep. 14, 2006

(51) Int. Cl.
*G01R 31/08* (2006.01)

(52) U.S. Cl. ........ 370/238; 370/394; 370/412; 370/429; 379/67.1

(58) Field of Classification Search .................. 370/238, 370/412–418, 428–429, 394, 516–519, 401; 704/202, 208, 275; 379/88.2, 67.1, 406.01; 369/2, 30.23; 711/162; 455/512; 360/55; 710/52

See application file for complete search history.

(56) References Cited

U.S. PATENT DOCUMENTS

| | | | |
|---|---|---|---|
| 5,566,146 A * | 10/1996 | Tobe | 369/2 |
| 6,108,728 A * | 8/2000 | Kobayashi | 710/74 |
| 6,452,950 B1 * | 9/2002 | Ohlsson et al. | 370/516 |
| 6,639,746 B1 * | 10/2003 | Chung et al. | 360/55 |
| 6,735,193 B1 * | 5/2004 | Bauer et al. | 370/352 |
| 6,744,764 B1 * | 6/2004 | Bigdeliazari et al. | 370/394 |
| 6,907,258 B2 * | 6/2005 | Tsutsumi et al. | 455/512 |
| 6,937,706 B2 * | 8/2005 | Bscheider et al. | 379/88.22 |
| 6,977,948 B1 * | 12/2005 | Chennubhotla et al. | 370/516 |
| 7,277,943 B1 * | 10/2007 | Surazski | 709/226 |
| RE40,634 E * | 2/2009 | Blair et al. | 379/67.1 |
| 7,529,160 B2 * | 5/2009 | Gotoh et al. | 369/30.23 |
| 7,743,183 B2 * | 6/2010 | Virdi et al. | 710/52 |
| 2001/0043685 A1 * | 11/2001 | Bscheider et al. | 379/88.22 |
| 2002/0172352 A1 * | 11/2002 | Mecayten | 379/406.01 |
| 2003/0067922 A1 * | 4/2003 | Yoshitani | 370/394 |
| 2004/0141512 A1 * | 7/2004 | Komagata et al. | 370/401 |
| 2004/0148175 A1 * | 7/2004 | Nieminen et al. | 704/275 |
| 2005/0114118 A1 * | 5/2005 | Peck | 704/208 |
| 2006/0212668 A1 * | 9/2006 | Furukawa et al. | 711/162 |

* cited by examiner

*Primary Examiner* — Kwang B Yao
*Assistant Examiner* — Vincelas Louis
(74) *Attorney, Agent, or Firm* — John C. Moran (57) ABSTRACT

A method and apparatus control effects of packet transmission delay on recorded audio information by determining if received audio information is to be used for a real time conversation or to be recorded; using a first size of jitter buffer upon the determined use being for the real time conversation; and using a second size of jitter buffer upon the determined use being to record the audio information whereby the second size of jitter buffer is larger than the first size of jitter buffer.

22 Claims, 8 Drawing Sheets

METHOD AND APPARATUS FOR IMPROVING VOICE RECORDING USING AN EXTENDED BUFFER

TECHNICAL FIELD

This invention relates to the recording of voice received from a packet switching system.

BACKGROUND OF THE INVENTION

Within the prior art, it is known to buffer packets being received from a packet switching network to handle the variance in delays experienced by the packets through the packet switching network. Such buffers are called jitter buffers. Within the prior art, it is known to utilize variable buffering for the jitter buffers. However, within the prior art, the jitter buffers are generally in the range of 10 to 100 milliseconds in length. The reason for the short length of the jitter buffers is to prevent delays during a telephone conversation. If the buffer length is too large, the delay from when a person speaks a word until the other person on the conversation hears that word will be unacceptable from a human factors point of view. However, the normal jitter buffer length used for telephone conversations does result in a quality loss due to packet loss resulting from the jitter. Hence, for telephone conversations, the length of the buffer is a trade-off between degradation of the voice quality and the amount the delay that is acceptable from a human factors point of view. However, the normal jitter buffer length used for telephone conversations does result in a quality loss due to packet loss resulting from the jitter being larger than the length of the jitter buffer. Voice mail systems, conference call recording systems, financial and legal service systems, or bureaus that do translation and transcription require high-quality voice. At the same time, the impact of delays due to long jitter buffers are inconsequential for recorded voice applications.

SUMMARY OF THE INVENTION

A method and apparatus control effects of packet transmission delay on recorded audio information by determining if received audio information is to be used for a real time conversation or to be recorded; using a first size of jitter buffer upon the determined use being for the real time conversation; and using a second size of jitter buffer upon the determined use being to record the audio information whereby the second size of jitter buffer is larger than the first size of jitter buffer.

DETAILED DESCRIPTION

Figure 1:
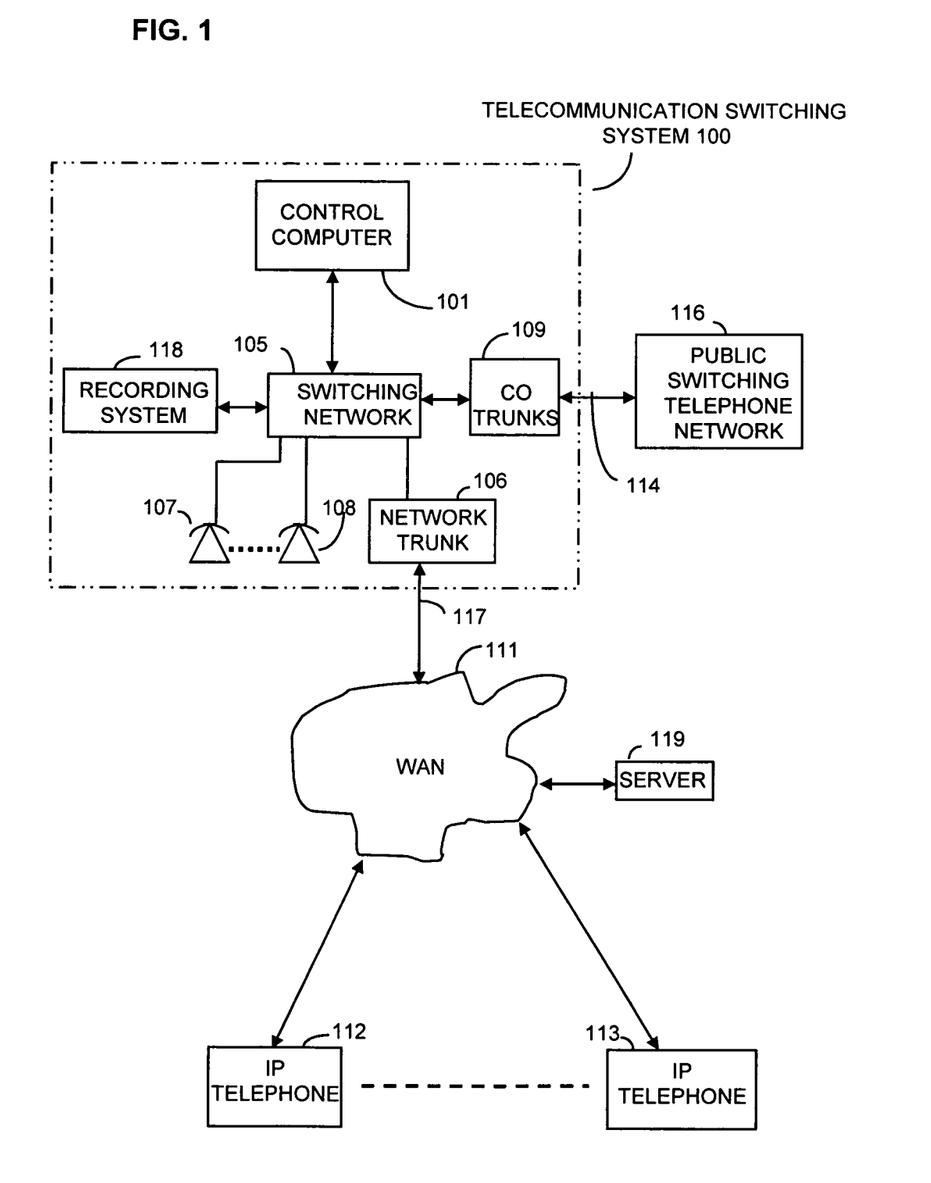
FIG. 1 illustrates, in block diagram form, an embodiment.

FIG. 1 illustrates a first embodiment. In FIG. 1, telecommunication switching system 100 is providing service for telephones 107-108 as well as for IP telephones 112-113 via WAN 111. Voice information being received from a IP telephone such as IP telephone 112 is received by network trunk 106 in the form of packets. Network trunk 106 converts the digital voice information in the packets to a form suitable for switching network 105. This form may be analog or a high quality digital protocol. Network trunk 106 performs the functions of the jitter buffer for each telephone conversation being received from a IP telephone via WAN 111. Control computer 101 performs overall control of telecommunication switching system 100. Telecommunication switching system 100 is interconnected to public switching telephone network 116 via CO trunks 109.

Recording system 118 is utilized by control computer 101 to record voice conversations. Such recording may be required so that telecommunication switching system 100 can provide voicemail operations, transcription services, or record voice conversations for other purposes which are well known to those skilled in the art. When control computer 101 determines that a voice conversation being received from an IP telephone needs to be recorded, it transmits control information to network trunk 106 to increase the jitter buffer size to that for recording voice conversations. For example, but not limited to, the length of the jitter buffer may be increased to 15 seconds. Such a long length helps to assure that the voice quality will be good.

Recording system 118 is illustrated as being part of telecommunication switching system 100. However, one skilled in the art would readily recognize that recording system 118 could be external to telecommunication switching system 100. For example, recording system 118 could be connected to public switching telephone network 116, and the voice information could be communicated to recording system 118 via public switching telephone network 116 from telecommunication switching system 100.

Figure 2:
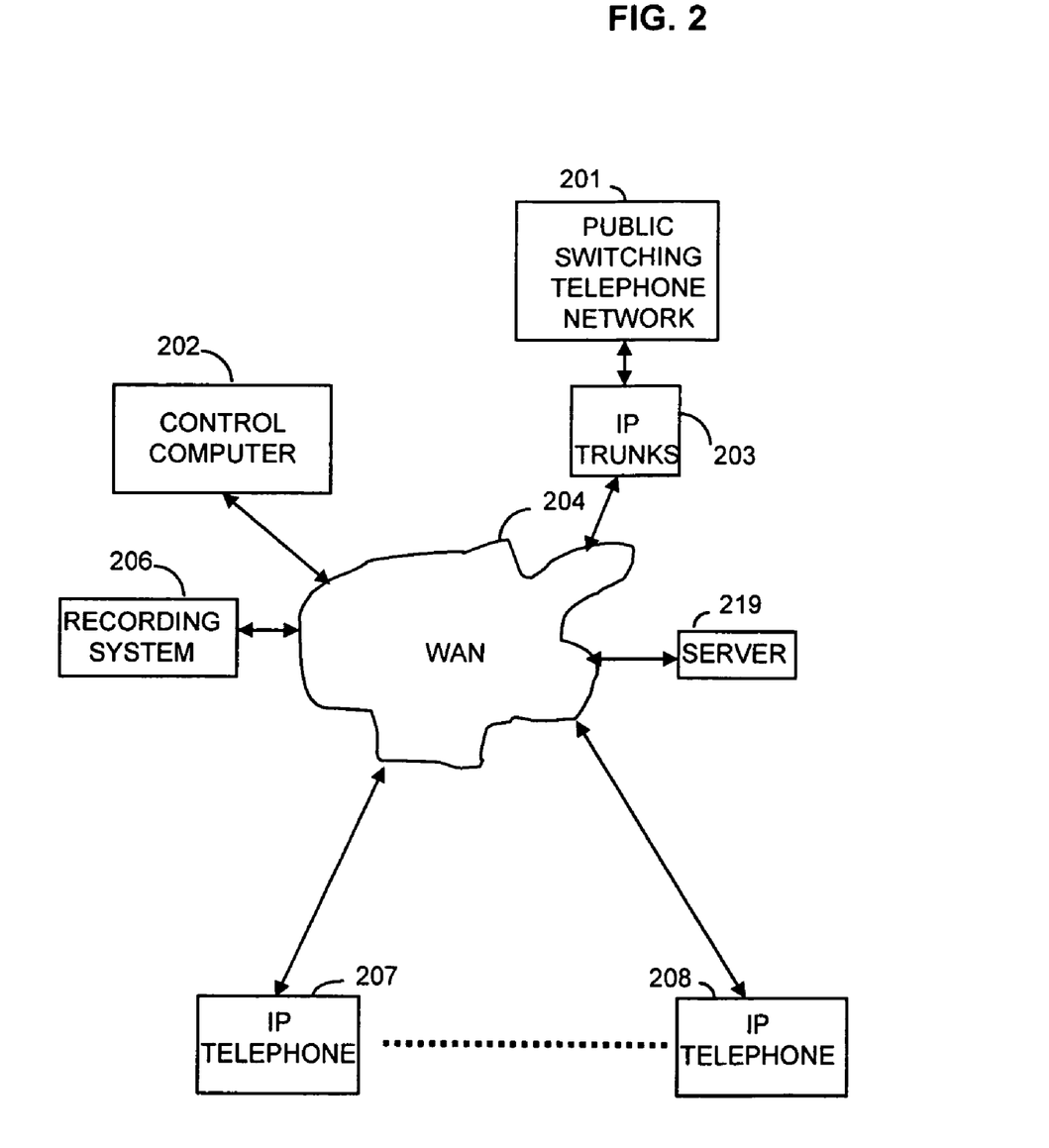
FIG. 2 illustrates, in block diagram form, a second embodiment.

FIG. 2 illustrates a second embodiment. In FIG. 2, recording system 206 records voice conversations under control of control computer 202. Recording system 206 receives audio information from WAN 204 for telephone conversations being carried on by an IP telephone such as IP telephones 207-208. In addition, the telephone conversations may be received from public switching telephone network 201 via IP trunks 203 and WAN 204. If recording system 206 is to record voice at high-quality, it will change the length of the jitter buffer to that for high-quality voice recording. To save space within recording system 206 and for other reasons known to those skilled in the art, recording system 206 will record some voice conversations using the normal telephone conversation jitter buffer length. Such telephone conversations may be those that are simply being recorded for later playback by a human being.

Figure 3:
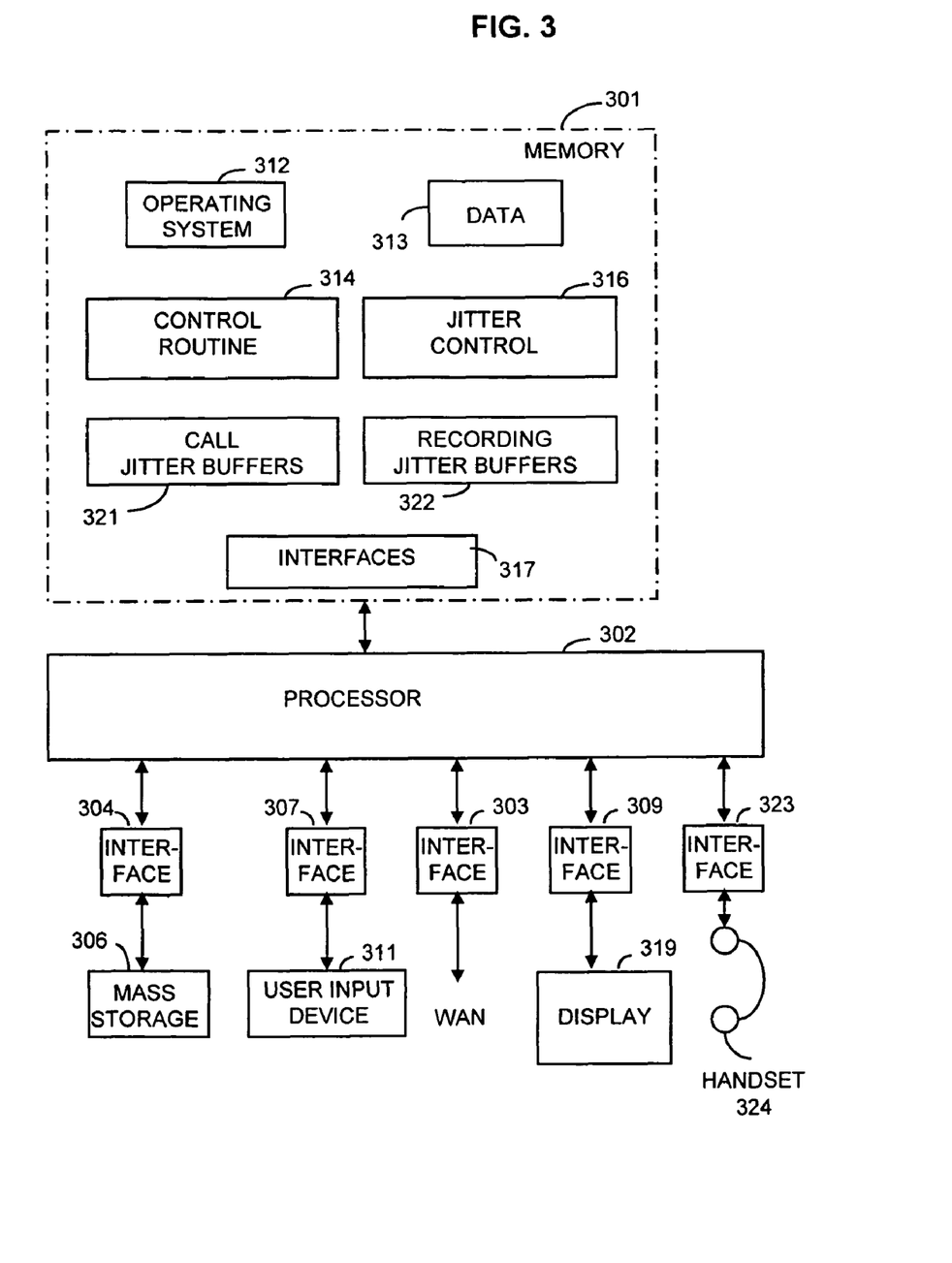
FIG. 3 illustrates, in block diagram form, a third embodiment.

FIG. 3 illustrates a third embodiment. In FIG. 3, an IP telephone, such as IP telephone 112, is illustrated. The IP telephone illustrated in FIG. 3 is providing voice storage for telephone conversations being communicated by the IP telephone. Processor 302 performs all control functions by executing control routine 314 and jitter control 316. Operating system 312 provides overall control of processor 302. Processor 302 stores and retrieves data from data 313. Using interfaces 317, processor 302 communicates with mass storage 306, user input device 311, WAN 111, handset 323, and display 319 via interfaces 304, 307, 303, 324, and 309, respectively. Processor 302 executes jitter control 316 to perform the functions of buffering packets being communicated for voice information. Jitter control 316 utilizes a buffer from call jitter buffers 321 to buffer the packets being received for a normal telephone call and a buffer from recording jitter buffers 322 for audio information that will be recorded.

When processor 302 determines that a voice conversation presently being communicated by the IP telephone illustrated in FIG. 3 needs to be recorded in mass storage 306, processor 302 transmits control commands to jitter control 316 to increase the jitter buffer length to that of a recorded telephone conversation.

Figure 4:
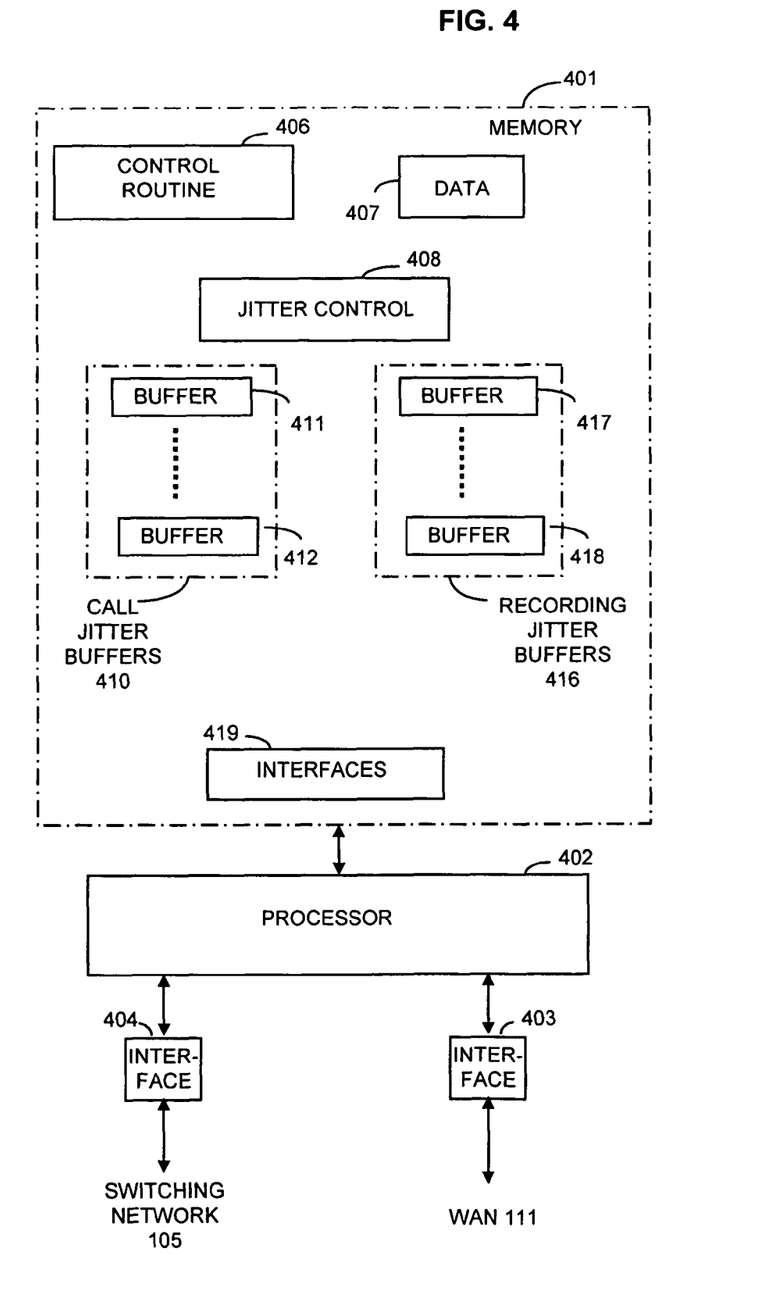
FIG. 4 illustrates, in block diagram form, greater detail of a network trunk.

FIG. 4 illustrates in greater detail a network trunk such as network trunk 106 of a FIG. 1. Processor 402 provides overall control of the network trunk by storing and executing instructions and data in memory 401. Processor 402 is interconnected to switching network 105 of FIG. 1 via interface 404 and WAN 111 of FIG. 1 via interface 403. Processor 402 to communicates with control computer 101 via interface 404 and switching network 105. Processor 402 provides overall control of the network trunk by executing control routine 406. Processor 402 provides the jitter control functions by executing jitter control 408.

Upon receiving a signal from control computer 101 that a normal telephone call is being processed, processor 402 by execution of jitter control 408 selects one of buffers 411-412 from call jitter buffers 410 to provide the buffering for the call. If on the other hand, control computer 101 signals that the audio information is going to be recorded, the jitter control 408 selects one of buffers 417-418 of recording jitter buffers 416.

Figure 5:
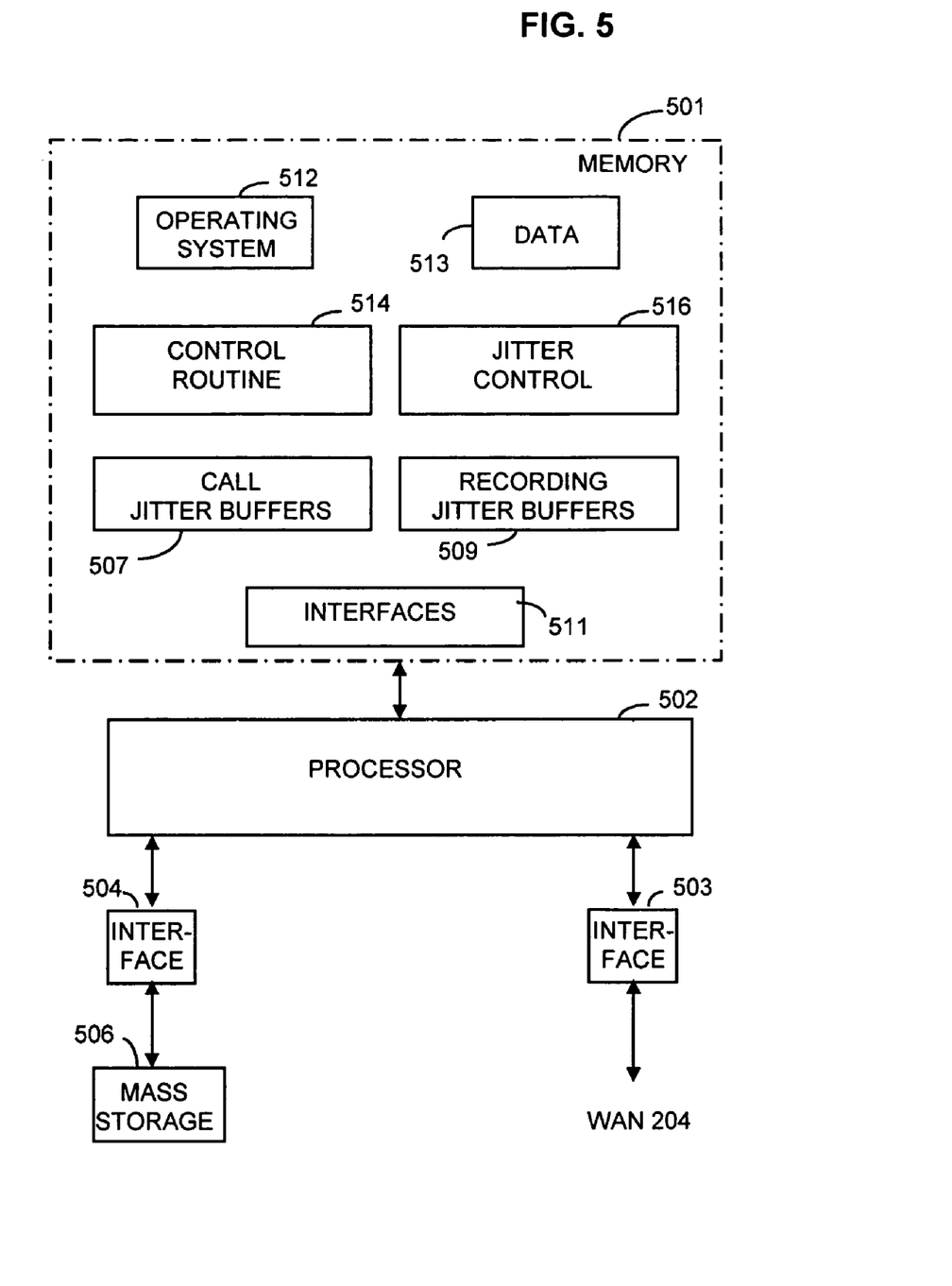
FIG. 5 illustrates, in block diagram form, greater detail of a recording system.

FIG. 5 illustrates a recording system such as recording system 206 of FIG. 2. Processor 502 provides the overall control of the recording system by executing programs such as operating system 512, control routine 514, interfaces routine 511, and jitter control 516 out of memory 501. Processor 502 stores recorded audio information in mass storage 506 via interface 504 utilizing interfaces routine 511. Processor 502 communicates with the other system elements illustrated on FIG. 2 via interface 503 and WAN 204.

When processor 502 receives control information from control computer 202 that audio information is to be recorded at normal telephone call quality, processor 502 by execution of jitter control 516 selects a buffer from call jitter buffers 507. When processor 502 receives control information from control computer 202 that audio information is to be recorded at a recording quality, processor 502 by execution of jitter control 516 selects a buffer from call jitter buffers 509.

Figure 6:
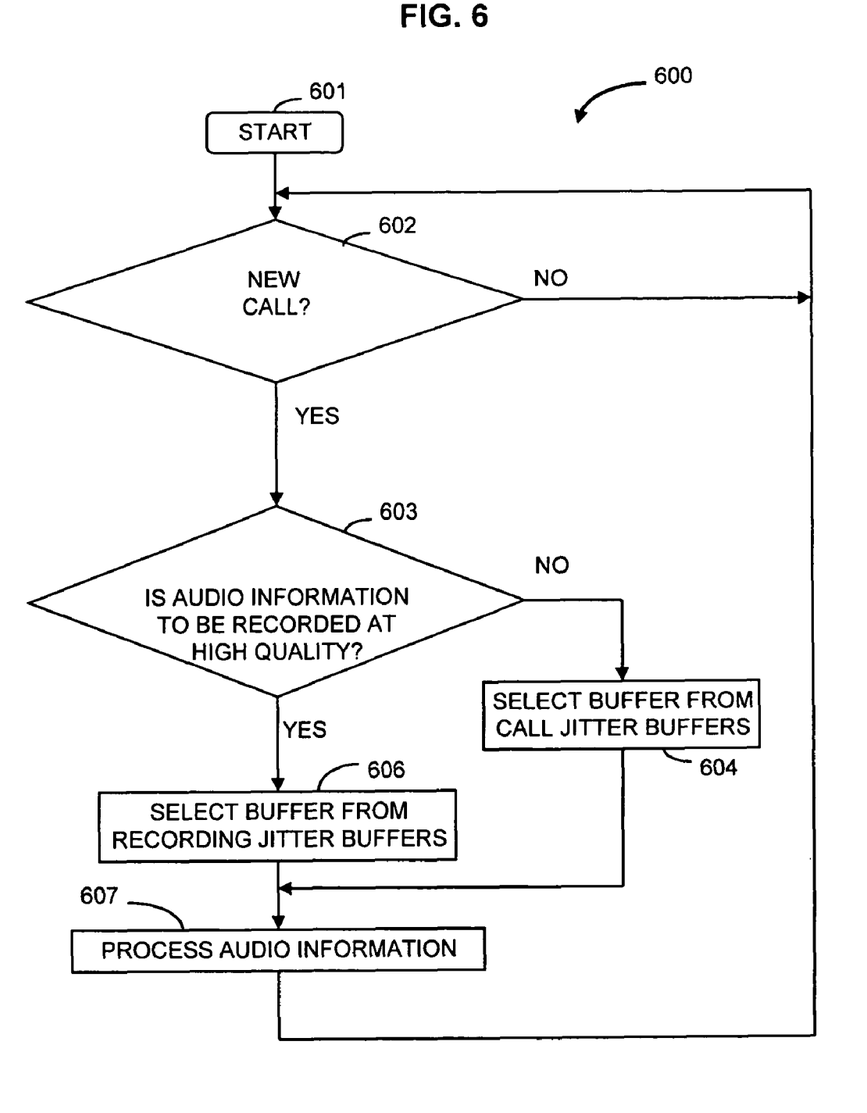
FIG. 6 illustrates, in flowchart form, operations of the embodiments.

FIG. 6 illustrates operations 600 that are performed by all three embodiments. After being started in block 601, decision block 602 determines if there is a new call to process. If the answer is no, control is returned to decision block 602.

If the answer in decision block 602 is yes, decision block 603 determines if the audio information is to be recorded at high-quality. In the first embodiment, control computer 101 of FIG. 1 transmit information to processor 402 of the network trunk designating how the audio information is to be processed. In the second embodiment, processor 502 of recording system 206 of FIG. 2 would receive this information from control computer 202 via WAN 204. In the third embodiment, processor 302 of FIG. 3 would make the determination by executing control routine 314.

If the answer is yes in decision block 603, block 606 selects a buffer from the recording jitter buffers for processing the audio information before transferring control to a block 607. Block 607 will continue to perform jitter operations on the audio information of the call after transferring control back to decision block 602. When the call terminates, block 607 terminates the processing of audio information.

If the answer is no in decision block 603, block 604 selects a buffer from the call jitter buffers for processing the audio information. Finally, block 604 transfers control to block 607 whose operations have already and described.

Figure 7:
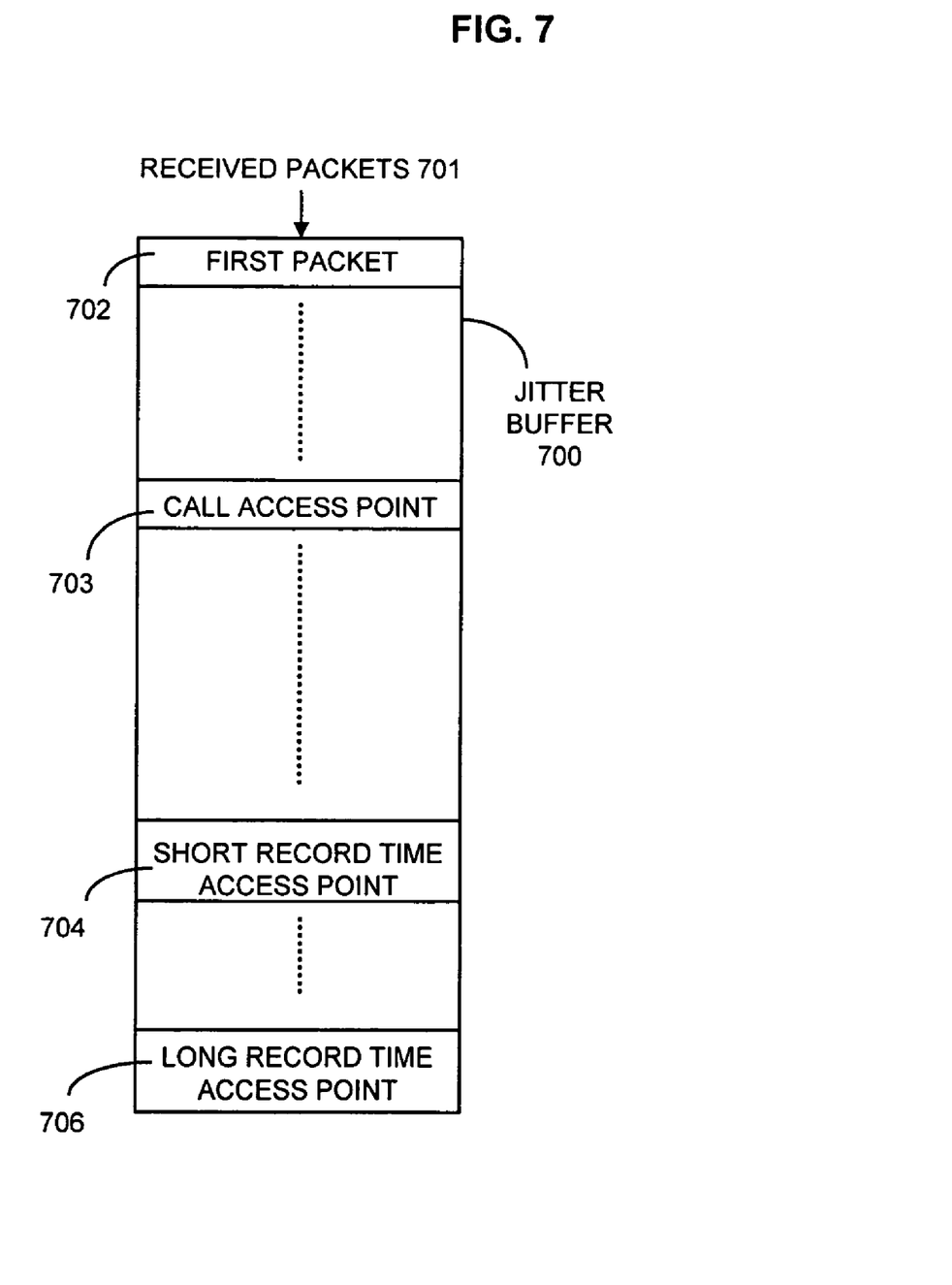
FIG. 7 illustrates, in block diagram form, another embodiment of the jitter buffer.

FIG. 7 illustrates jitter buffer 700 which is another embodiment of a jitter buffer. Jitter buffer 700 could be utilized in FIG. 4 instead of buffers 410 and 416. Jitter buffer 700 may be implemented as a first-in-last out buffer with the data flowing from packet 702 to the packet that would be contained in 706. One skilled in the art could envision many different implementations of jitter buffer 700. Packets that are to be utilized in a telephone conversation are extracted from call access point 703 which could advantageously be 10 to 100 ms from first packet 702. One skilled in the art could readily envision that the precise location of call access point 703 in jitter buffer 700 could vary during a telephone conversation as is well known in the art. Further, one skilled in the art could readily envision that access points 703-706 could allow accessing information as a bit, byte, word, or packet per access.

For certain types of audio recording such as a voice messaging system, it may not be necessary to have a long jitter buffer time. If this is the case, short record time access point 704 would be utilized to extract packets from jitter buffer 700. Short record time access point 704 could advantageously have a jitter buffer time of 1 second. For a high-quality recording, long record time access point 706 would be utilize. Long record time access point 706 could advantageously have a jitter buffer time of 5 seconds.

Figure 8:
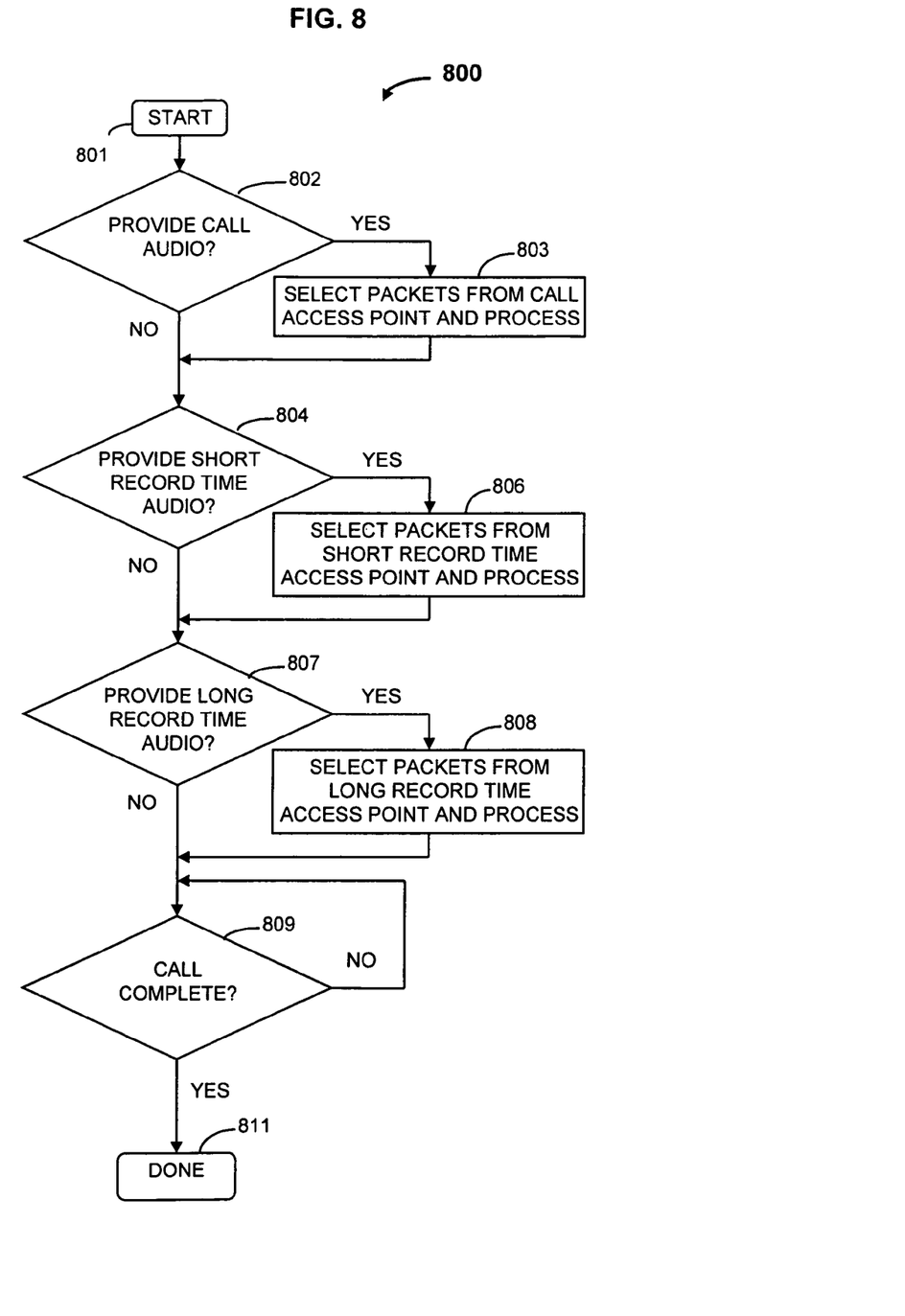
FIG. 8 illustrates, in flowchart form, operations of the other embodiment of the jitter buffer.

In FIG. 8, operations 800 illustrate the operations performed in utilizing jitter buffer 700 of FIG. 7. As illustrated in FIG. 8, all three access points can be simultaneously utilized to provide audio information. After being started in block 801, decision block 802 determines if audio information is to be provided for a telephone conversation. If the answer is yes, block 803 selects packets from call access point 703 and processes the selected packets into audio information.

If the answer in decision block 802 is no or after execution of block 803, decision block 804 determines if audio information is to be provided for a lower quality recording. If the answer is yes, block 806 selects packets from short record time access point 704 and processes the selected packets into audio information.

If the answer in decision block 804 is no or after execution of block 806, decision block 807 determines if audio information is to be provided for a high quality recording. If the answer is yes, block 808 selects packets from long record time access point 706 and processes the selected packets into audio information.

After execution of a block 808 or if the answer in decision block 807 is no, decision block 809 determines if the call is complete. If the answer is no, decision block 809 is re-executed. If the answer is yes in decision block 809, operations 800 are ended by the execution of block 811.

When the operations of a telephone set, control computer, processor or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The telephone set, control computer, processor or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared apparatus or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the telephone set, control computer, processor or server is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for controlling effects of packet transmission delay on recorded audio information, comprising:
    determining by a subsystem that received audio information is to be simultaneously used both for a real time conversation and is to be recorded;
    using by the subsystem a first size of jitter buffer for a the real time conversation;
    using by the subsystem a second size of jitter buffer for the audio information to be recorded whereby the second size of jitter buffer is larger than the first size of jitter buffer;
    supplying simultaneously by the subsystem audio information for the real time conversation by using the first size of jitter buffer; and
    supplying simultaneously by the subsystem audio information to a messaging system by using the second size of jitter buffer wherein the messaging system is separate from the subsystem.

2. The method of claim 1 wherein the first and second size of jitter buffers are part of one memory for receiving the audio information;
    removing by the subsystem audio information with a short storage time in the one memory to create the first size of jitter buffer; and
    removing by the subsystem audio information with a long storage time in the one memory to create the second size of jitter buffer.

3. The method of claim 1 wherein the first and second size of jitter buffers are part of one memory for receiving the audio information;
    removing by the subsystem audio information with a short storage time in the one memory to create the first size of jitter buffer; and
    removing by the subsystem audio information with a long storage time that is longer than the short storage time in the one memory to create the second size of jitter buffer.

4. Apparatus for implementing the method of claim 3.

5. The method of claim 1 wherein the first size of jitter buffer is of a first size of memory and the second size of jitter buffer is of a second size of memory.

6. Apparatus for implementing the method of claim 5.

7. Apparatus for implementing the method of claim 1.

8. A method for controlling effects of packet transmission delay on recorded audio information, comprising:
    determining by a subsystem if received audio information is to be used for a real time conversation or to be recorded;
    using by the subsystem a first size of jitter buffer upon the determined use being for the real time conversation whereby the real time conversation is at a first quality level;
    using by the subsystem a second size of jitter buffer upon the determined use being to record the audio information at a second quality level whereby the second size of jitter buffer is larger than the first size of jitter buffer; and
    using by the subsystem a third size of jitter buffer upon the determined use being to record the audio information by a messaging system at a third quality level whereby the third quality level is higher than the first quality level and the third size of jitter buffer is larger than the first and second size of jitter buffers wherein the messaging system is separate from the subsystem.

9. The method of claim 8 wherein the determining further comprises determining that the audio information is to be used for both the real time conversation and is to be recorded at the first and second quality levels;
    supplying audio information for the real time conversation by using the first size of jitter buffer;
    supplying audio information for the recorded audio information at the first quality level by using the second size of jitter buffer; and
    supplying audio information for the recorded audio information at the second quality level by using the third size of jitter buffer.

10. The method of claim 9 wherein the first, second, and third size of jitter buffers are part of one memory for receiving the audio information;
    removing by the subsystem audio information with a short storage time in the one memory to create the first size of jitter buffer;
    removing by the subsystem audio information to be recorded at the first quality level with a longer storage time than that used for the audio information used for the first size of jitter buffer in the one memory to create the second size of jitter buffer; and
    removing by the subsystem audio information with a storage time that is longer than that used for audio information to be recorded at the first quality level in the one memory to create the third size of jitter buffer.

11. The method of claim 8 wherein the first, second, and third size of jitter buffers are part of one memory for receiving the audio information;
    removing by the subsystem audio information with a short storage time in the one memory to create the first size of jitter buffer;
    removing by the subsystem audio information to be recorded at the first quality level with a longer storage time than that used for the audio information used for the first size of jitter buffer in the one memory to create the second size of jitter buffer; and removing by the subsystem audio information with a storage time that is longer than that used for audio information to be recorded at the first quality level in the one memory to create the third size of jitter buffer.

12. The method of claim 8 wherein the first size of jitter buffer is of a first size of memory, the second size a of jitter buffer is of a second size of memory, and the third size of jitter buffer is of a third size of memory.

13. Apparatus for implementing the method of claim 8.

14. A computer-readable non-transitory medium stored in a subsystem for controlling effects of packet transmission delay on recorded audio information, comprising computer-executable instructions configured for:

determining that received audio information is to be simultaneously used both for a real time conversation and is to be recorded;

using a first size of jitter buffer for the real time conversation;

using a second size of jitter buffer for the audio information to be recorded whereby the second size of jitter buffer is larger than the first size of jitter buffer;

supplying simultaneously information for the real time conversation by using the first size of jitter buffer; and supplying simultaneously audio information to a messaging system by using the second size of jitter buffer wherein the messaging system is separate from the subsystem.

15. The computer-readable non-transitory medium of claim 14 wherein the first and second size of jitter buffers are part of one memory for receiving the audio information and the computer-readable medium further comprises computer-executable instructions for removing audio information with a short storage time in the one memory to create the first size of jitter buffer; and computer-executable instructions for removing audio information with a long storage time in the one memory to create the second size of jitter buffer.

16. The computer-readable non-transitory medium of claim 14 wherein the first and second size of jitter buffers are part of one memory for receiving the audio information and the computer-readable medium further comprises computer-executable instructions for removing audio information with a short storage time in the one memory to create the first size of jitter buffer; and computer-executable instructions for removing audio information with a long storage time that is longer than the short storage time in the one memory to create the second size of jitter buffer.

17. The computer-readable non-transitory medium of claim 14 wherein the first size of jitter buffer is of a first size of memory and the second size of jitter buffer is of a second size of memory.

18. A computer-readable non-transitory medium stored in a subsystem for controlling effects of packet transmission delay on recorded audio information, comprising computer-executable instructions configured for:

determining if received audio information is to be used for a real time conversation or to be recorded;

using a first size of jitter buffer upon the determined use being for the real time conversation whereby the real time conversation is at a first quality level;

using a second size of jitter buffer upon the determined use being to record the audio information at a second quality level whereby the second size of jitter buffer is larger than the first size of jitter buffer; and using a third size of jitter buffer upon the determined use being to record the audio information by a messaging system at a third quality level whereby the third quality level is higher than the first quality level and the third size of jitter buffer is larger than the first and second size of jitter buffers wherein the messaging system is separate from the subsystem.

19. The computer-readable non-transitory medium of claim 18 wherein the computer-executable instructions for determining further comprise computer-executable instructions for determining that the audio information is to be used for both the real time conversation and is to be recorded at the first and second quality levels;

computer-executable instructions for supplying audio information for the real time conversation by using the first size of jitter buffer;

computer-executable instructions for supplying audio information for the recorded audio information at the first quality level by using the second size of jitter buffer; and computer-executable instructions for supplying audio information for the recorded audio information at the second quality level by using the third size of jitter buffer.

20. The computer-readable non-transitory medium of claim 19 wherein the first, second, and third size of jitter buffers are part of one memory for receiving the audio information and the computer-readable medium further comprises computer-executable instructions for removing audio information with a short storage time in the one memory to create the first size of jitter buffer;

computer-executable instructions for removing audio information to be recorded at the first quality level with a longer storage time than that used for the audio information used for the first size of jitter buffer in the one memory to create the second size of jitter buffer; and computer-executable instructions for removing audio information with a storage time that is longer than that used for audio information to be recorded at the first quality level in the one memory to create the third size of jitter buffer.

21. The computer-readable non-transitory medium of claim 18 wherein the first, second, and third size of jitter buffers are part of one memory for receiving the audio information and the computer-readable medium further comprises computer-executable instructions for removing audio information with a short storage time in the one memory to create the first size of jitter buffer;

computer-executable instructions for removing audio information to be recorded at the first quality level with a longer storage time than that used for the audio information used for the first size of jitter buffer in the one memory to create the second size of jitter buffer; and computer-executable instructions for removing audio information with a storage time that is longer than that used for audio information to be recorded at the first quality level in the one memory to create the third size of jitter buffer.

22. The computer-readable non-transitory medium of claim 18 wherein the first size of jitter buffer is of a first size of memory, the second size of jitter buffer is of a second size of memory, and the third size of jitter buffer is of a third size of memory.

\* \* \* \* \*